No. 770,643.

Patented September 20, 1904.

UNITED STATES PATENT OFFICE.

ERNST KLIE, OF CHARLOTTENBURG, GERMANY, ASSIGNOR TO THE FIRM OF CHEMISCH - TECHNISCHE FABRIK DR. ALB. R. W. BRAND U. CO., GESELLSCHAFT MIT BESCHRAENKTER HAFTUNG.

PROCESS OF COLORING NATURAL CRYSTALLINE STONES.

SPECIFICATION forming part of Letters Patent No. 770,643, dated September 20, 1904.

Application filed April 20, 1904. Serial No. 204,122. (No specimens.)

*To all whom it may concern:*

Be it known that I, ERNST KLIE, doctor of philosophy, a subject of the King of Prussia and the German Emperor, residing at 3 Gutenbergstrasse, Charlottenburg, German Empire, have invented new and useful Improvements in Processes of Coloring Natural Crystalline Stones, of which the following is a specification.

This invention relates to the process of coloring natural crystalline stones, especially marble, by means of metallic soaps, and has for its object to enable a more complete coloring of the stone, even in its interior parts, and to render the process more expeditious and considerably cheaper.

If one wishes to color natural crystalline stones containing carbonate of calcium—for instance, natural marble—by means of introducing solutions of metallic soaps into the stone, a reaction of the metallic soaps with the carbonate will occur after a short time if a relatively small amount of silicic acid is present in the stone, or after a long time if a relatively large amount of silicic acid is present in the stone. As by the said reaction the color of the originally-introduced metallic soap is changed, it is necessary to effect the reaction between the stone and the metallic stone in as short time as possible. A ready reaction of carbonate of calcium with metallic soaps may, however, be caused only at high temperatures, by which a decomposition of the stone, especially marble, to be colored is caused, thus that the opalescent properties, the structure, the stability, and the splendor of the stone will be injured. It is practically impossible to polish a stone thus treated or to work it with instruments.

The object of this invention is to meet the said inconveniences.

The new process is based on the new observation that organic acids, especially acetic acid, when dissolved in volatile oils—for instance, turpentine-oil—does not decompose marble or affect it injuriously, but can be introduced into the stone commonly with the said oils. I have found that metallic salts of fatty acids—for instance, of palmitic, stearic, or oleic acid, the so-called "metallic" soaps—dissolved in volatile oils containing free organic acids may be introduced into natural crystalline stones, as natural marble, at the ordinary atmospheric pressure. If the stone thus treated is gently heated, the formation of colored precipitates will occur. The present free organic acid will substitute the more weak fatty acid and form with the metal a compound insoluble in water. For instance, oleate of iron dissolved in turpentine-oil containing acetic acid will give basic acetate of iron when gently heated. Also the following reaction may occur: The organic acid introduced into the stone by means of volatile oils in which metallic soaps have been dissolved combines itself with the metal of the soap, and the thus formed metallic salt of the organic acid reacts with the carbonate of calcium under formation of insoluble carbonates of metals and soluble organic calcium salts. If one lixiviates the stones thus treated with water, the formed precipitates will remain in the stone and the soluble calcium salts will be removed from the stone.

My process consists in that I use metallic soaps of those metals the salts of which with organic acids react easily with carbonate of calcium in presence of organic acids stronger than the fatty acids of the metallic soaps. For instance, I may prepare a solution of thirty to forty parts, by weight, oleate of copper in one hundred parts, by weight, of turpentine-oil and add to the said solution five parts, by weight, of acetic acid, which is nearly that amount of acetic acid required for a complete decomposition of the oleate of copper, according to the formula:

$(C_{18}H_{33}O_2)_2Cu + 2C_2H_4O_2 =$
Oleate of copper.   Acetic acid.
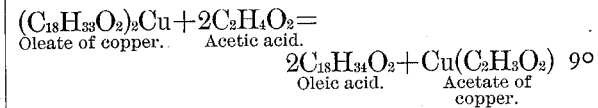
$2C_{18}H_{34}O_2 + Cu(C_2H_3O_2)$
Oleic acid.   Acetate of copper.

I have found that the presence of free organic acid—for instance, acetic acid—effects that the metallic soap—for instance, oleate of iron—is more soluble in turpentine-oil than without the said addition. I may use the soaps of those metals that form colored carbonates or give with organic acids colored precipitates insoluble in water. The skilled workman will select the compounds suitable for his purposes, according to the value of the substances and the color desired.

I may carry out the coloring of the stone in the following manner: I dry the natural marble thus that it is practically free from water, place the dried stone into the solution of the metallic soaps in turpentine-oil with acetic acid, and heat the solution to temperatures between 50° and 70° centigrade. Then I take the stone from the solution, heat it in order to volatilize the solvent and lixiviate it with water. Thereupon I may dry the stone and finish it by treating with instruments.

What I claim as my invention, and desire to secure by Letters Patent, is—

1. The process of coloring natural crystalline stones containing carbonate of calcium which consists in drying the stone, placing it into a solution of metallic soaps in volatile oil and organic acids stronger than the fatty acids of the metallic soaps and heating the said solution.

2. The process of coloring natural crystalline stones containing carbonate of calcium which consists in drying the stone, placing it into a solution of metallic oleate in turpentine-oil and acetic acid and heating the said solution.

In witness whereof I have hereunto signed my name, this 7th day of April, 1904, in the presence of two subscribing witnesses.

ERNST KLIE.

Witnesses:
 WOLDEMAR HAUPT,
 HENRY HASPER.